(12) United States Patent
Okami et al.

(10) Patent No.: US 10,087,813 B2
(45) Date of Patent: Oct. 2, 2018

(54) HEAT EXCHANGER

(71) Applicant: FUTABA INDUSTRIAL CO., LTD., Aichi (JP)

(72) Inventors: Hirohisa Okami, Aichi (JP); Hisayuki Kato, Aichi (JP)

(73) Assignee: Futaba Industrial Co., Ltd., Aichi (JP)

( * ) Notice: Subject to any disclaimer, the term of this patent is extended or adjusted under 35 U.S.C. 154(b) by 220 days.

(21) Appl. No.: 14/759,994

(22) PCT Filed: Jan. 10, 2014

(86) PCT No.: PCT/JP2014/050314
§ 371 (c)(1),
(2) Date: Jul. 9, 2015

(87) PCT Pub. No.: WO2014/109381
PCT Pub. Date: Jul. 17, 2014

(65) Prior Publication Data
US 2015/0338169 A1    Nov. 26, 2015

(30) Foreign Application Priority Data

Jan. 11, 2013   (JP) ................................. 2013-003708

(51) Int. Cl.
*F28D 7/10*       (2006.01)
*F01N 13/18*      (2010.01)
(Continued)

(52) U.S. Cl.
CPC ........... *F01N 13/1872* (2013.01); *F01N 5/02* (2013.01); *F28D 9/0006* (2013.01);
(Continued)

(58) Field of Classification Search
CPC .......... F28F 2210/08; F28F 3/046; F28F 3/12; F28F 13/08; F28D 9/0006; F28D 9/0043;
(Continued)

(56) References Cited

U.S. PATENT DOCUMENTS

| | | | |
|---|---|---|---|
| 4,291,752 A | | 9/1981 | Bridgnell |
| 4,923,003 A | * | 5/1990 | Stenlund .................. F28F 1/42 |
| | | | 165/154 |

(Continued)

FOREIGN PATENT DOCUMENTS

| | | |
|---|---|---|
| JP | S55-060188 A | 5/1980 |
| JP | S59-32881 U | 2/1984 |

(Continued)

OTHER PUBLICATIONS

International Search Report issued in corresponding International Patent Application No. PCT/JP2014/050314 dated Apr. 15, 2014.

(Continued)

*Primary Examiner* — Len Tran
*Assistant Examiner* — Jon T Schermerhorn
(74) *Attorney, Agent, or Firm* — Morgan, Lewis & Bockius LLP

(57) ABSTRACT

A heat exchanger allows efficient heat exchange between a first fluid and a second fluid which flows inside the heat exchanger. A heat exchanger includes a heat exchanger main body housed inside a case where a first fluid flows and which houses a second fluid therein. The heat exchanger main body has a plurality of first passages such that the first fluid flows across the inside of the heat exchanger main body. In a side view from one direction, the heat exchanger main body has a shape that is left-right symmetric about the central axis of the case and of which the upstream side protrudes farther in the upstream direction toward the center. The first passages extend parallel to the central axis of the case, and are formed to be longer as they are disposed closer to the center of the heat exchanger main body.

2 Claims, 13 Drawing Sheets

(51) Int. Cl.
  *F01N 5/02* (2006.01)
  *F28F 3/04* (2006.01)
  *F28D 9/00* (2006.01)
  *F28D 21/00* (2006.01)
  *F28F 3/12* (2006.01)
  *F28F 13/08* (2006.01)
  *F28D 1/053* (2006.01)
  *F28D 7/16* (2006.01)

(52) U.S. Cl.
  CPC ......... *F28D 9/0043* (2013.01); *F28D 9/0056* (2013.01); *F28D 21/0003* (2013.01); *F28F 3/046* (2013.01); *F28F 3/12* (2013.01); *F28F 13/08* (2013.01); *F28D 1/05358* (2013.01); *F28D 7/1684* (2013.01); *F28D 2021/008* (2013.01); *F28F 2210/08* (2013.01); *Y02T 10/16* (2013.01)

(58) Field of Classification Search
  CPC ............... F28D 9/0056; F28D 21/0003; F01N 13/1872; F01N 5/02
  See application file for complete search history.

(56) References Cited

U.S. PATENT DOCUMENTS

2004/0083712 A1* 5/2004 Dewis ............... F02C 7/08
  60/39.511
2004/0237303 A1* 12/2004 Maude ............... B01J 19/249
  29/890
2009/0183862 A1 7/2009 Benezech et al.

FOREIGN PATENT DOCUMENTS

| JP | 2003-130571 A | 5/2003 |
| JP | 2007-518053 A | 7/2007 |
| JP | 2007-225190 A | 9/2007 |
| JP | 2012-127548 A | 7/2012 |

OTHER PUBLICATIONS

Notice of Reasons for Rejection dated Feb. 23, 2017 from the Japanese Patent Office in counterpart Japanese application No. 2013-003708.

* cited by examiner

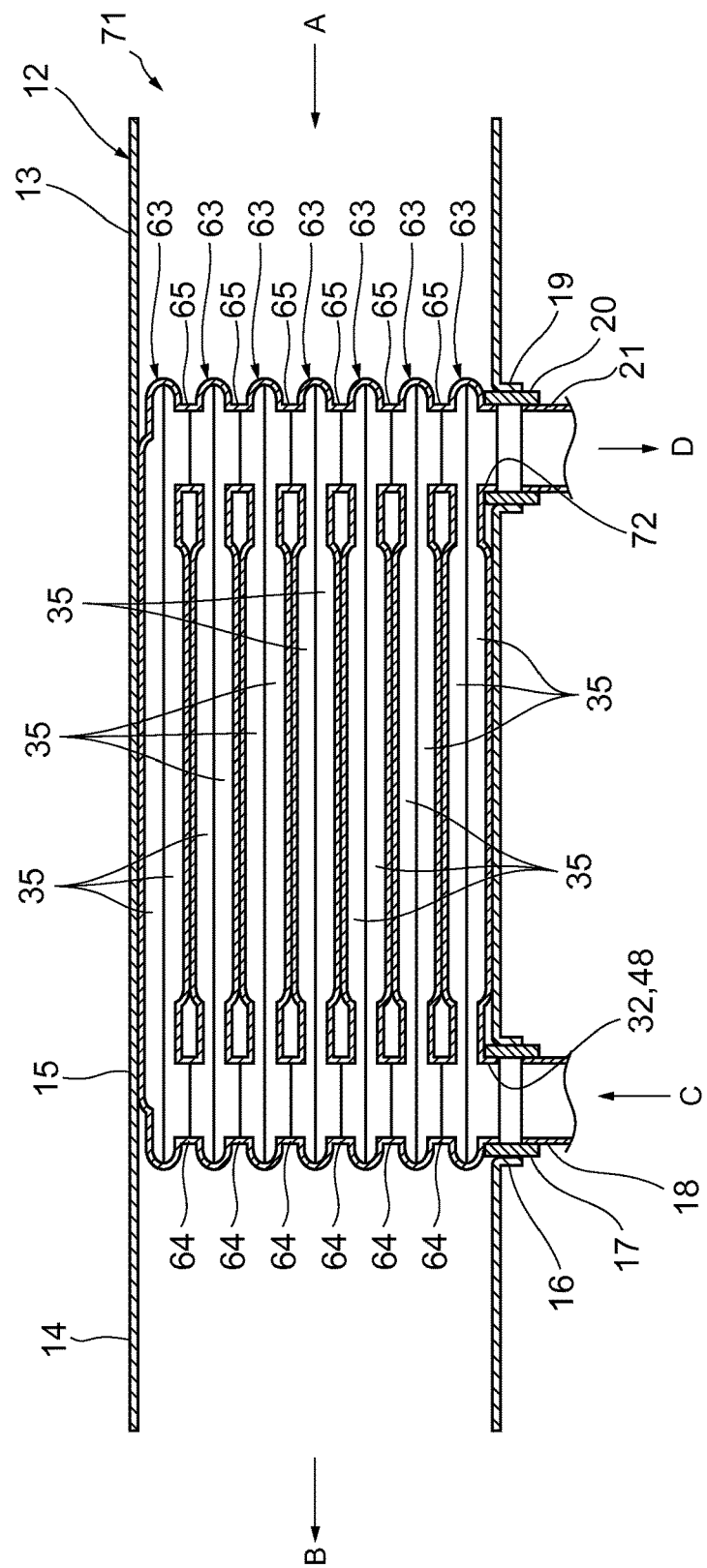

HEAT EXCHANGER

TECHNICAL FIELD

The present invention relates to a heat exchanger which exchanges heat between a first fluid and a second fluid.

BACKGROUND ART

Conventionally, there are heat exchangers which exchange heat between a first fluid and a second fluid, for example, heat exchangers which exchange heat between exhaust gas and cooling water in an internal combustion engine of a vehicle.

For example, a heat exchanger disclosed in Patent Literature 1 is housed in a case (outer tube), and exchanges heat between a first fluid (exhaust gas etc.) and a second fluid (cooling water etc.) as the first fluid is supplied to the case and the second fluid is supplied to the inside of the heat exchanger.

CITATION LIST

Patent Literature

Patent Literature 1

Japanese Unexamined Patent Application Publication No. 2007-225190

SUMMARY OF INVENTION

Technical Problem

Generally, the first fluid flowing inside the case flows faster when it is closer to the central axis of the case, and flows more slowly when it is closer to the outside, i.e., the side wall of the case. That is, the flow velocity of the first fluid varies in a cross-section perpendicular to the central axis of the case.

Therefore, when the heat exchanger housing the second fluid is provided inside the case, where the first fluid flows, to exchange heat between the first fluid and the second fluid, in the outside portion of the heat exchanger, heat is not sufficiently exchanged as the first fluid after exchanging heat does not flow out smoothly to the downstream side, which may result in lower efficiency of heat exchange between the first fluid and the second fluid.

An object of the present invention is to provide a heat exchanger which allows efficient heat exchange between a first fluid and a second fluid which flows inside the heat exchanger.

Solution to Problem

In order to achieve the above mentioned object, a heat exchanger according to the present invention which exchanges heat between a first fluid and a second fluid, includes a heat exchanger main body which is housed inside a case where the first fluid flows and which houses the second fluid therein, wherein the heat exchanger main body has a plurality of first passages which are disposed such that the first fluid flows across the inside of the heat exchanger main body, in a side view from one direction, the plurality of first passages form a shape which is left-right symmetric about the central axis of the case and of which the upstream side protrudes farther in the upstream direction toward the center, and the plurality of first passages extend substantially parallel to the central axis of the case, and are formed to be longer as they are disposed closer to the center of the heat exchanger main body.

According to this configuration, as the first fluid hits the upstream side of the heat exchanger main body, the first fluid spreads easily from the center of the heat exchanger main body toward the outside, i.e., the side wall of the case, and flows efficiently to the vicinity of the outside of the heat exchanger main body. Since the first passages extend substantially parallel to the central axis of the case, the first fluid flows parallel to the central axis of the case with as little resistance as possible. Moreover, since the plurality of first passages are formed to be longer as they are disposed closer to the center of the heat exchanger main body, the first fluid flows easily to the vicinity of the outside where the passages are shorter than in the vicinity of the center of the heat exchanger main body.

Thus, according to this configuration, the first fluid flows throughout the heat exchanger main body as evenly as possible, which allows efficient heat exchange between the first fluid and the second fluid.

In the heat exchanger according to the present invention, it is preferable that a supply port for supplying the second fluid to the inside of the heat exchanger main body is formed in the heat exchanger main body either at the center on the upstream side or at the center on the downstream side, that a discharge port for discharging the second fluid from the inside of the heat exchanger main body is formed in the heat exchanger main body either at the center on the upstream side or at the center on the downstream side, whichever side is not provided with the supply port, that the heat exchanger main body has a plurality of second passages which are disposed such that the second fluid supplied from the supply port flows toward the discharge port, and that the plurality of second passages extend substantially parallel to the central axis of the case, and are formed to be longer as they are disposed closer to the center of the heat exchanger main body.

According to this configuration, since the supply port and the discharge port are located on the central axis of the case in a side view from one direction, and the second passages extend substantially parallel to the central axis of the case, the second fluid flows parallel to the central axis of the case with as little resistance as possible. Moreover, since the plurality of second passages are formed to be longer as they are disposed closer to the center of the heat exchanger main body, the second fluid supplied from the supply port flows easily to the vicinity of the outside of the heat exchanger main body. Thus, according to this configuration, the second fluid flows throughout the inside of the heat exchanger main body as evenly as possible, which allows efficient heat exchange between the first fluid and the second fluid.

In the heat exchanger according to the present invention, it is preferable that the passage width of the first passages on the upstream side increases toward the upstream side.

According to this configuration, since the first fluid flows easily into the first passages, the first fluid can be supplied efficiently to the heat exchanger main body, which allows more efficient heat exchange.

In the heat exchanger according to the present invention, it is preferable that the passage width of the second passages on the upstream side increases toward the upstream side.

According to this configuration, since the second fluid flows easily into the second passages, the second fluid can be supplied efficiently to the second passages, which allows more efficient heat exchange.

Advantageous Effects of Invention

According to the present invention, it is possible to provide a heat exchanger which allows efficient heat exchange between a first fluid and a second fluid which flows inside the heat exchanger.

BRIEF DESCRIPTION OF DRAWINGS

FIG. 13 is a view, equivalent to FIG. 4, showing a heat exchanger of a third embodiment of the present invention.

DESCRIPTION OF EMBODIMENTS

Figure 1:
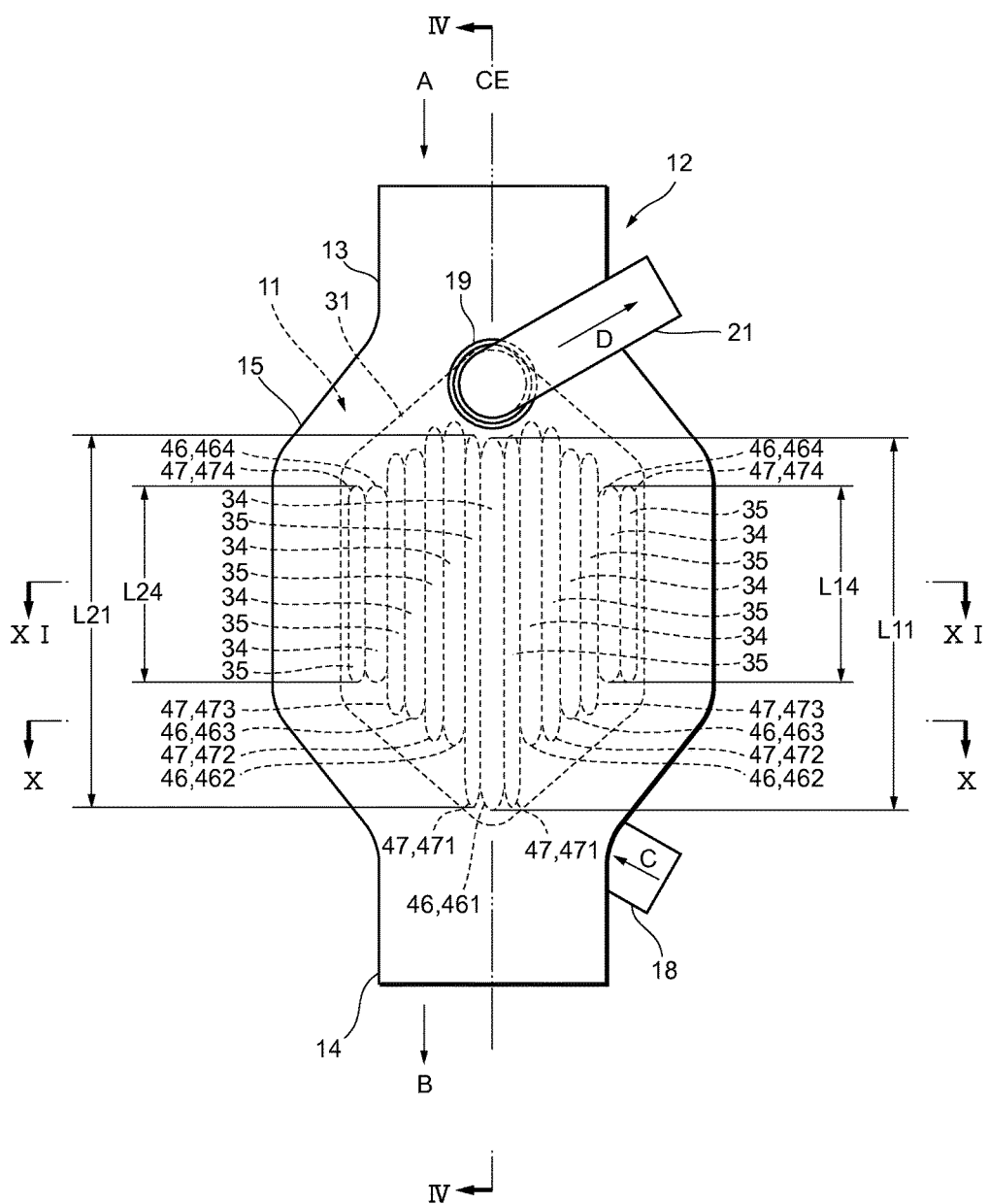
FIG. 1 is a top view showing a state where a heat exchanger of a first embodiment of the present invention is housed in a case.
Figure 2:
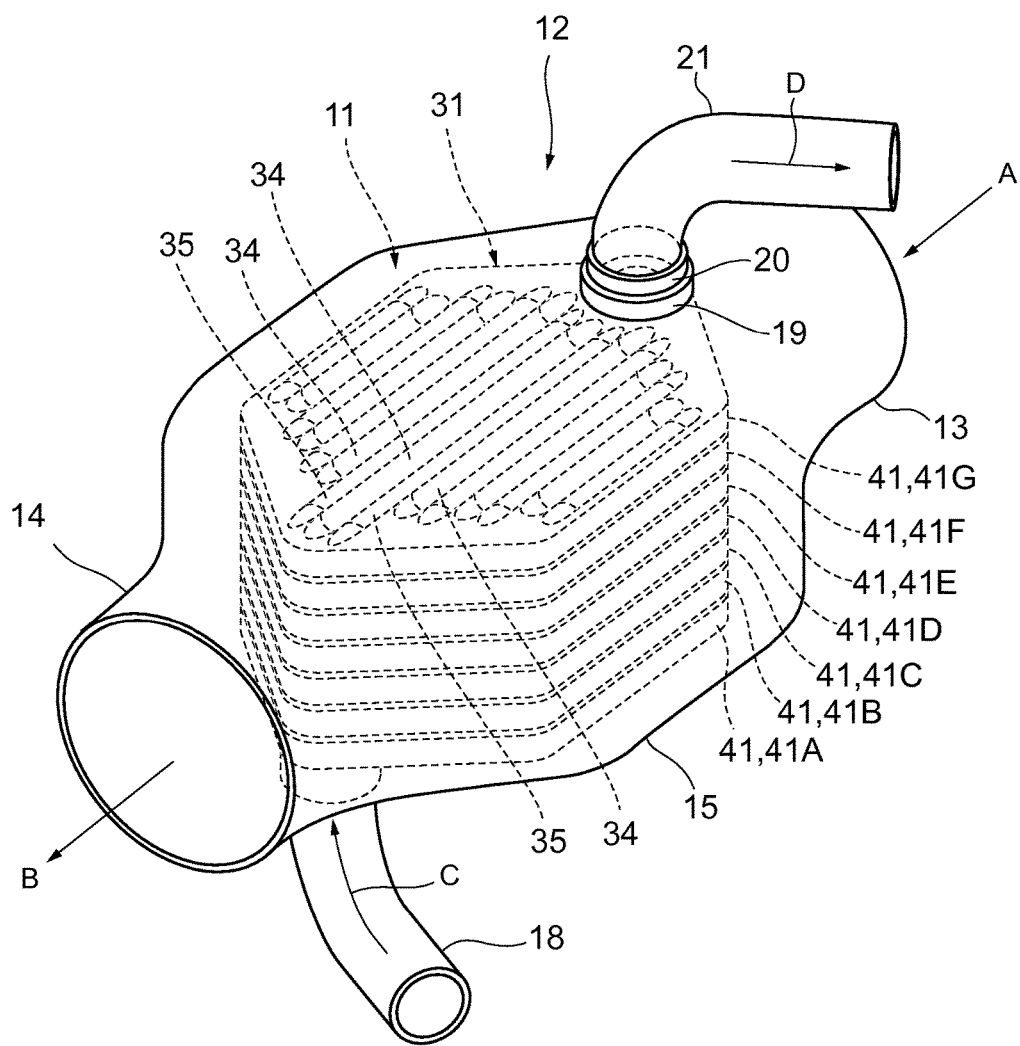
FIG. 2 is a perspective view showing a state where the heat exchanger is housed in the case.

In the following, heat exchangers of embodiments of the present invention will be described with reference to the drawings, by means of an example where the present invention is applied to a heat exchanger which exchanges heat between exhaust gas (first fluid) discharged from an internal combustion engine of a vehicle and cooling water (second fluid) housed inside the heat exchanger. To make the description easy to understand, the same components in the drawings will be denoted by the same reference signs as far as possible, while a repeated description thereof will be omitted.

For the convenience of description, the direction orthogonal to the central axis of the case in the top view of the case shown in FIG. 1 will be referred to as the left-right direction, and the lower side of the case shown in FIG. 1 will be referred to as the downstream side. The following embodiment will be described using a side view from above, i.e., a top view of the case as an example of the side view.

The expression "center" used in the description refers to the center in the width of the heat exchanger in the left-right direction. The expression "left-right symmetry" used in the description does not mean strict left-right symmetry but encompasses asymmetric shapes within the scope of the present invention.

First Embodiment

A heat exchanger which is a first embodiment of the present invention will be described with reference to FIG. 1 to FIG. 11.

As shown in FIG. 1 to FIG. 4, a heat exchanger 11 is housed in a case 12.

(Case)

The case 12 is a cylindrical metal member forming a part of a passage through which exhaust gas generated in an internal combustion engine (not shown) flows, and is provided in an exhaust passage on the downstream side of the internal combustion engine. In FIG. 1 to FIG. 4, the flow direction of the exhaust gas flowing in toward the case 12 is indicated by the arrow A, and the flow direction of the exhaust gas flowing out of the case 12 is indicated by the arrow B.

An opening part (hereinafter referred to as an inlet part 13) on the upstream side of the case 12 and an opening part (hereinafter referred to as an outlet part 14) on the downstream side both have a circular cylindrical shape. A housing part 15 which houses the heat exchanger 11 is formed between the inlet part 13 and the outlet part 14. The housing part 15 has a rectangular cylindrical shape, with the opening in the vicinity of the center in the axial direction being larger than the inlet part 13 and the outlet part 14. The upstream side of the housing part 15 is reduced in diameter and connected with the inlet part 13, and the downstream side is also reduced in diameter and connected with the outlet part 14. The central axis of the inlet part 13, the central axis of the outlet part 14, and the central axis of the housing part 15 coincide with one another (hereinafter, the central axis of the inlet part 13, the central axis of the outlet part 14, and the central axis of the housing part 15 will be referred to as a central axis CE of the case 12. The following description assumes that this central axis CE is linear. The above expression, "The central axis of the inlet part 13, the central axis of the outlet part 14, and the central axis of the housing part 15 coincide with one another" does not mean strict coincidence, but encompasses coincidence with offset within the scope of the present invention).

In a side view from one direction, in this embodiment, in the top view as shown in FIG. 1, the shape of the case 12 is left-right symmetric relative to the central axis CE of the case 12.

Figure 3:
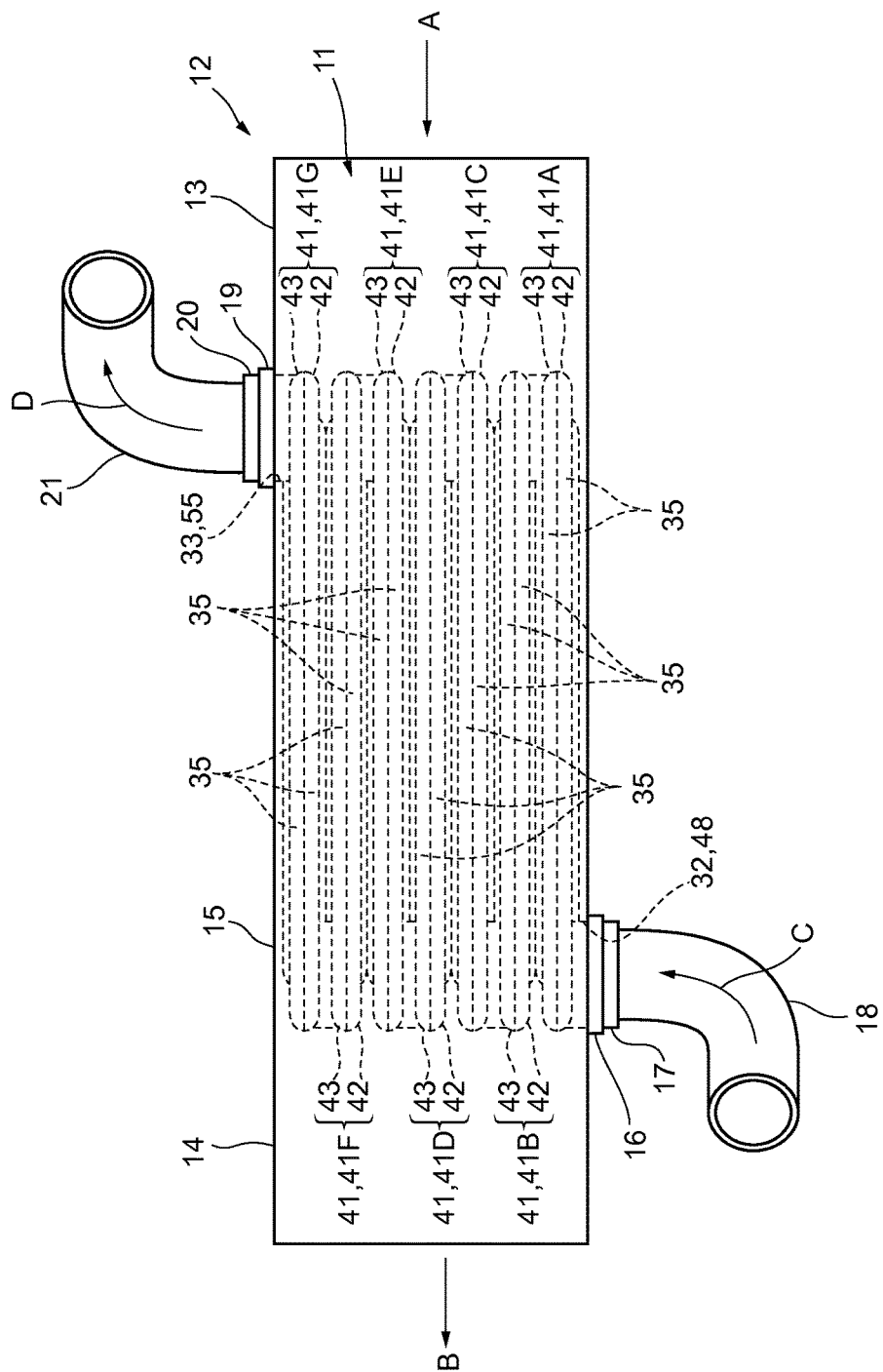
FIG. 3 is a side view showing a state where the heat exchanger is housed in the case.
Figure 4:
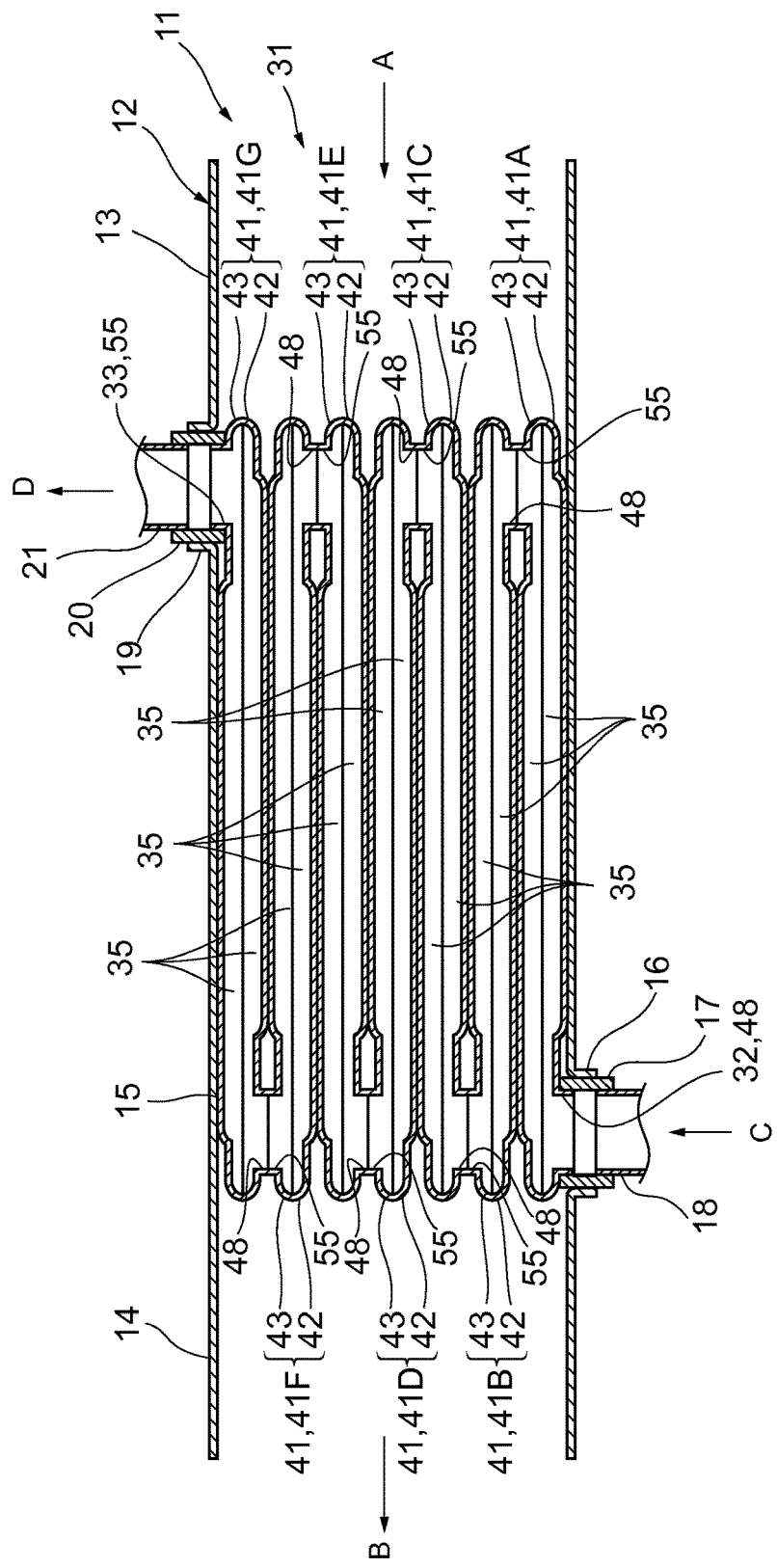
FIG. 4 is a cross-sectional view along the line IV-IV of FIG. 1.

As shown in FIG. 3 and FIG. 4, a circular cylindrical downstream-side opening part 16 is provided in the lower surface of the housing part 15, at the center in the left-right direction on the downstream side. On the inner peripheral side of the downstream-side opening part 16, a circular cylindrical first seal member 17 is provided. On the inner peripheral side of the first seal member 17, a first tube 18 is connected. That is, as shown in FIG. 4, the first seal member 17 is held between the downstream-side opening part 16 and the first tube 18, so that the airtightness between the downstream-side opening part 16 and the first tube 18 is maintained. Cooling water is constantly supplied to the first tube 18. The cooling water flows through the first tube 18 into the heat exchanger 11. In FIG. 1 to FIG. 4, the flow direction of the exhaust gas flowing from the first tube 18 toward the heat exchanger 11 is indicated by the arrow C.

As shown in FIG. 3 and FIG. 4, a circular cylindrical upstream-side opening part 19 is provided in the upper surface of the housing part 15, at the center in the left-right direction on the upstream side. On the inner peripheral side of the upstream-side opening part 19, a circular cylindrical second seal member 20 is provided. On the inner peripheral side of the second seal member 20, a second tube 21 is connected. That is, as shown in FIG. 4, the second seal member 20 is held between the upstream-side opening part 19 and the second tube 21, so that the airtightness between the upstream-side opening part 19 and the second tube 21 is maintained. Cooling water discharged from the heat exchanger 11 flows through the second tube 21. In FIG. 1 to FIG. 4, the flow direction of the exhaust gas flowing from the heat exchanger 11 toward the second tube 21 is indicated by the arrow D.

(Heat Exchanger)

Figure 5:
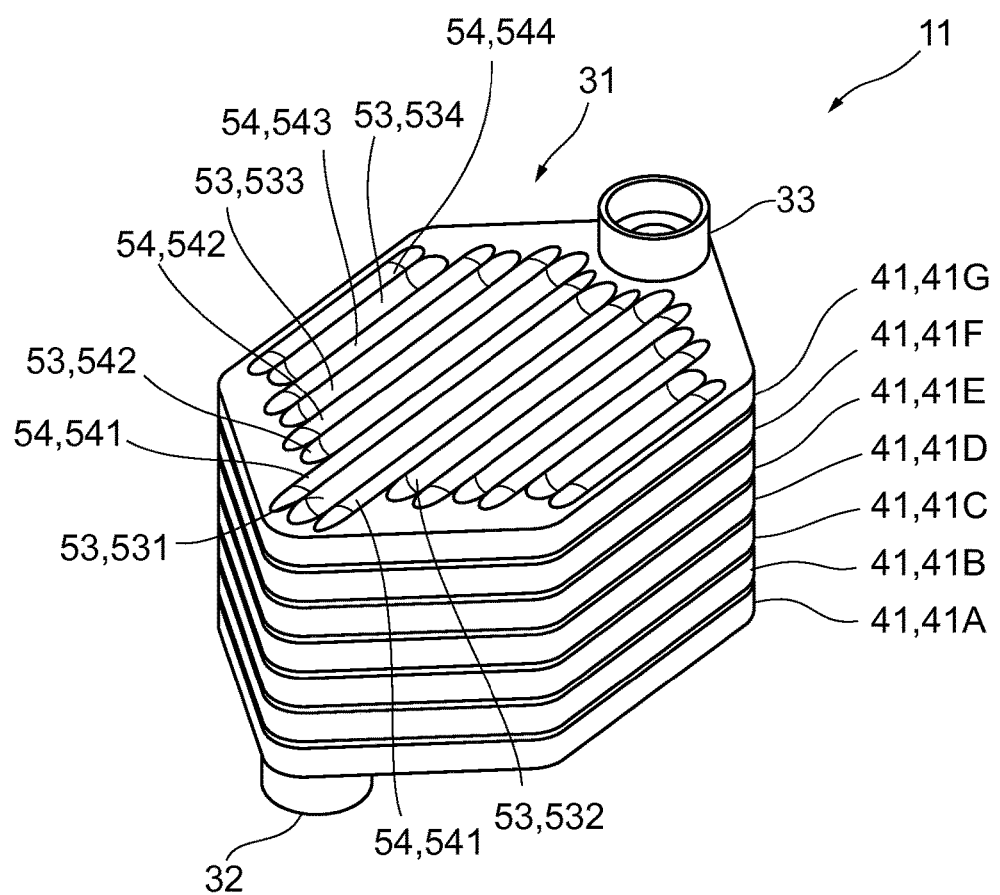
FIG. 5 is a perspective view showing the heat exchanger.

The heat exchanger 11 is composed of a metal material, and as also shown in FIG. 5, includes a heat exchanger main body 31, a supply port 32, and a discharge port 33.

Figure 6:
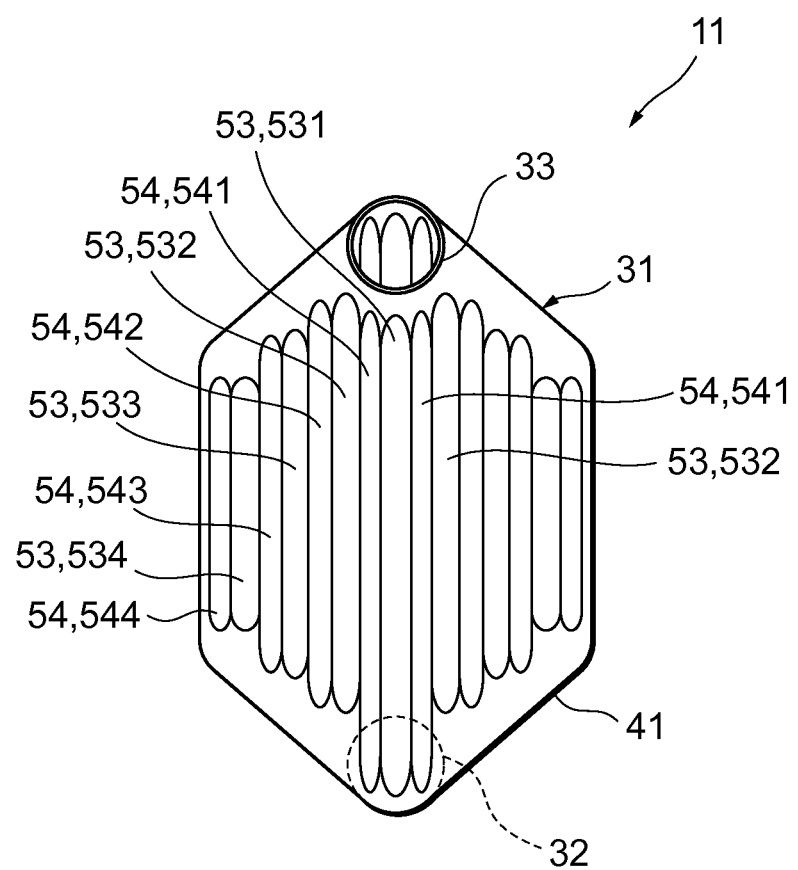
FIG. 6 is a top view showing the heat exchanger.
Figure 7:
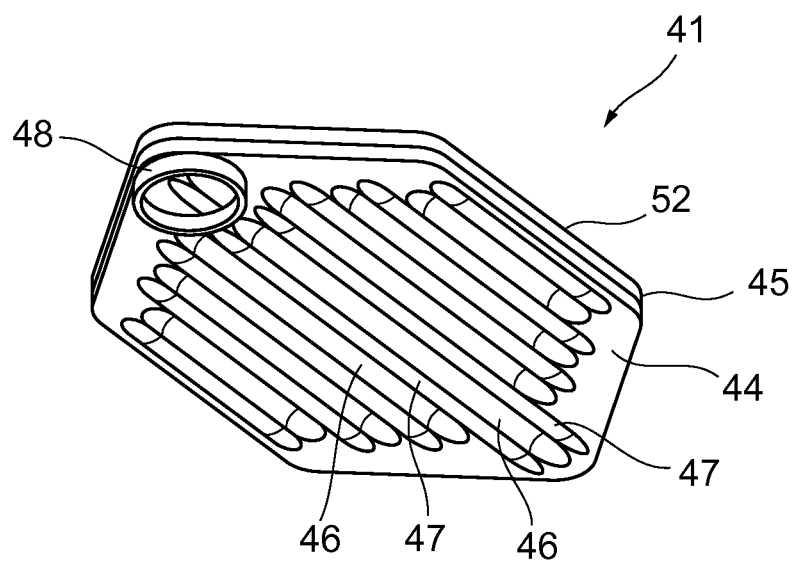
FIG. 7 is a perspective view from below of a heat exchanger piece.
Figure 8:
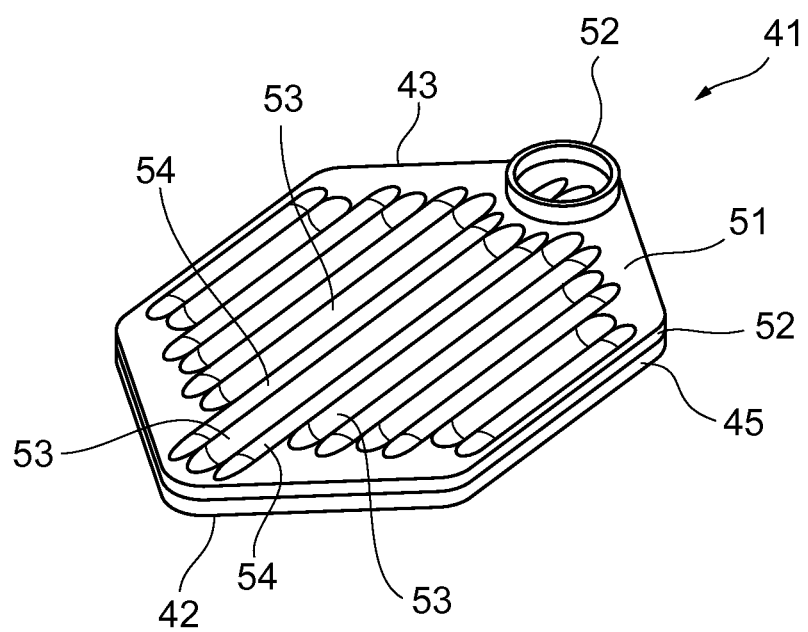
FIG. 8 is a perspective view from above of the heat exchanger piece.

As shown in FIG. 1 and FIG. 6, the heat exchanger main body 31 is a member having a plurality of first passages 34, through which the exhaust gas flows across the inside of the heat exchanger main body 31, and second passages 35 which house the cooling water inside the heat exchanger main body 31 and through which this cooling water flows.

In a side view from one direction, in this embodiment, in the top view as shown in FIG. 1, the shape of the heat exchanger main body 31 is left-right symmetric about the central axis CE of the case 12. The heat exchanger main body 31 has a shape of which the upstream side protrudes farther in the upstream direction toward the center, while the downstream side protrudes farther in the downstream direction toward the center.

In the top view, the heat exchanger main body 31 has a hexagonal shape as shown in FIG. 1, and as also shown in FIG. 5, has a hexagonal columnar shape as a whole. The heat exchanger main body 31 is disposed such that one vertex of the hexagonal shape protrudes farthest in the upstream direction, and the vertex diagonally opposite to that vertex protrudes farthest in the downstream direction. Moreover, the heat exchanger main body 31 is disposed inside the housing part 15 of the case 12 such that the center of the heat exchanger main body 31 coincides with the central axis CE of the case 12. Thus, in the top view, the heat exchanger main body 31 is disposed in left-right symmetry about the central axis CE of the case 12 as described above.

Details of the heat exchanger main body 31 will be described later.

The supply port 32 is a circular opening part for supplying cooling water from the first tube 18 to the inside of the heat exchanger main body 31. The supply port 32 is formed in the heat exchanger main body 31, either at the center on the upstream side or at the center on the downstream side, and in this embodiment, as shown in FIG. 4, the supply port 32 is formed in the lower surface of the heat exchanger main body 31, in the vicinity of the end which is the most downstream side at the center on the downstream side. The outer peripheral surface of the supply port 32 is in contact with the inner peripheral surface of the seal member 17, and the supply port 32 is fixed by brazing etc. on the case 12 through the first seal member 17. That is, the first seal member 17 is held between the supply port 32 and the downstream-side opening part 16, so that the airtightness between the supply port 32 and the downstream-side opening part 16 is maintained.

The discharge port 33 is a circular opening part for discharging the cooling water from the inside of the heat exchanger main body 31 to the second tube 21. The discharge port 33 is formed in the heat exchanger main body 31, either at the center on the upstream side or at the center on the downstream side, whichever side is not provided with the supply port 32, and in this embodiment, the discharge port 33 is provided in the heat exchanger main body 31 at the center on the upstream side. More specifically, the discharge port 33 is formed in the upper surface of the heat exchanger main body 31, in the vicinity of the end which is the most upstream side at the center on the upstream side. The outer peripheral surface of the discharge port 33 is in contact with the inner peripheral surface of the second seal member 20, and the discharge port 33 is fixed by brazing etc. on the case 12 through the second seal member 20. That is, the second seal member 20 is held between the discharge port 33 and the upstream-side opening part 19, so that the airtightness between the discharge port 33 and the upstream-side opening part 19 is maintained.

Next, the heat exchanger main body 31 will be described in detail.

As shown in FIG. 3 to FIG. 5, the heat exchanger main body 31 is composed of a stack of a plurality of heat exchanger pieces 41, in this embodiment, seven heat exchanger pieces 41. As also shown in FIG. 7 to FIG. 11, the heat exchanger pieces 41 each have a hollow shape and include a lower plate member 42 which forms a lower part of the heat exchanger piece 41 and an upper plate member 43 which forms an upper part of the heat exchanger piece 41.

Figure 9:
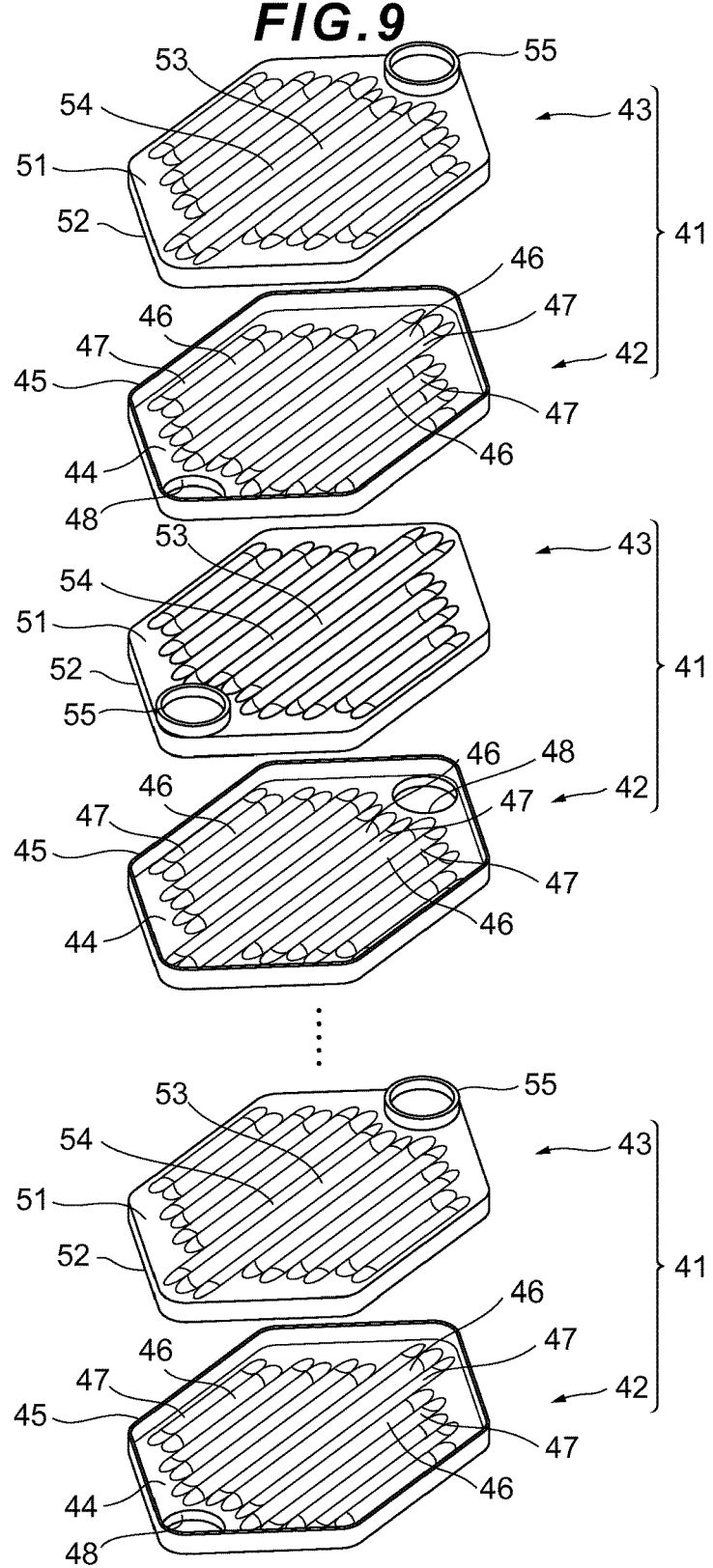
FIG. 9 is an exploded perspective view of the heat exchanger.
Figure 10:
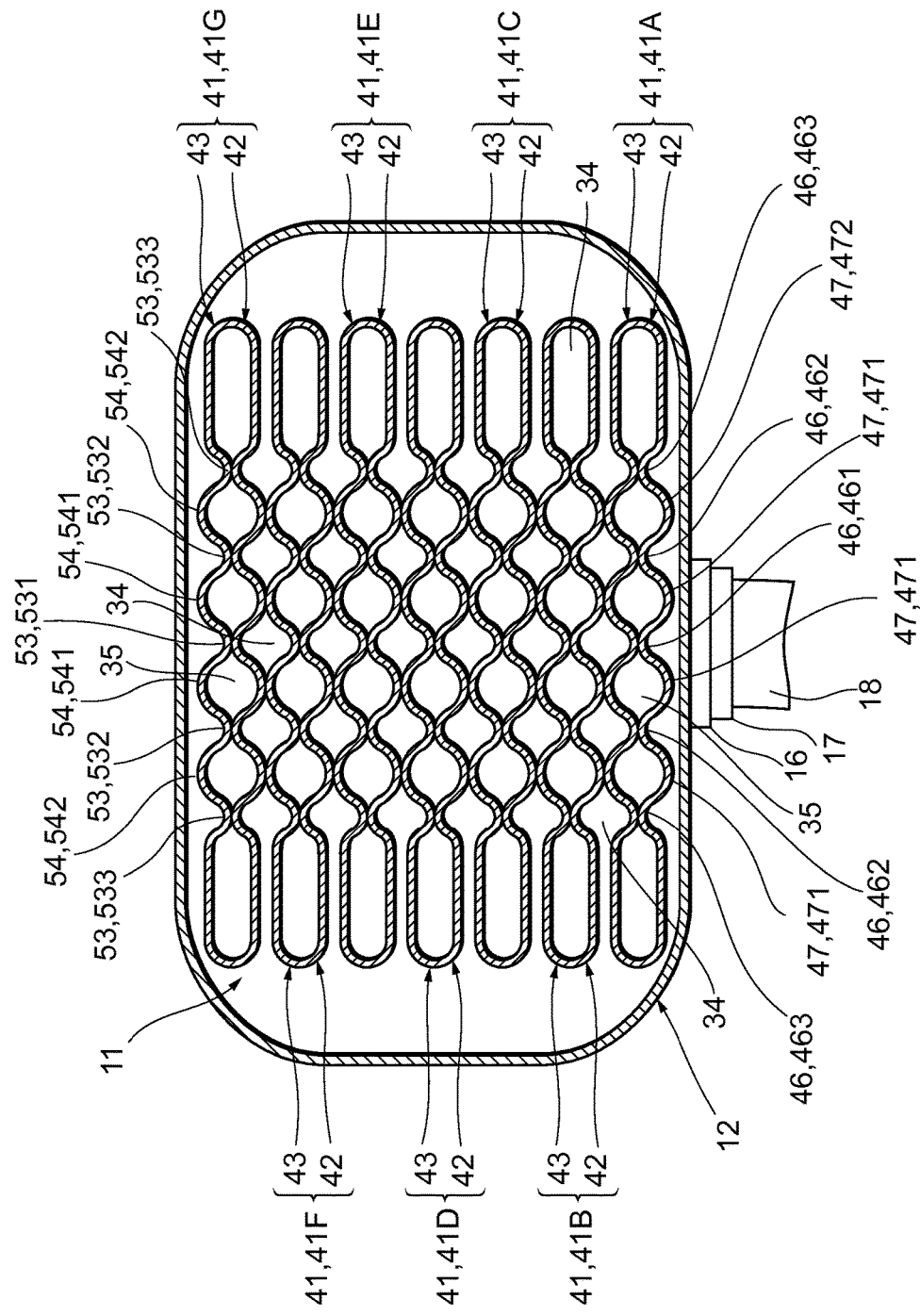
FIG. 10 is a cross-sectional view along the line X-X of FIG. 1.
Figure 11:
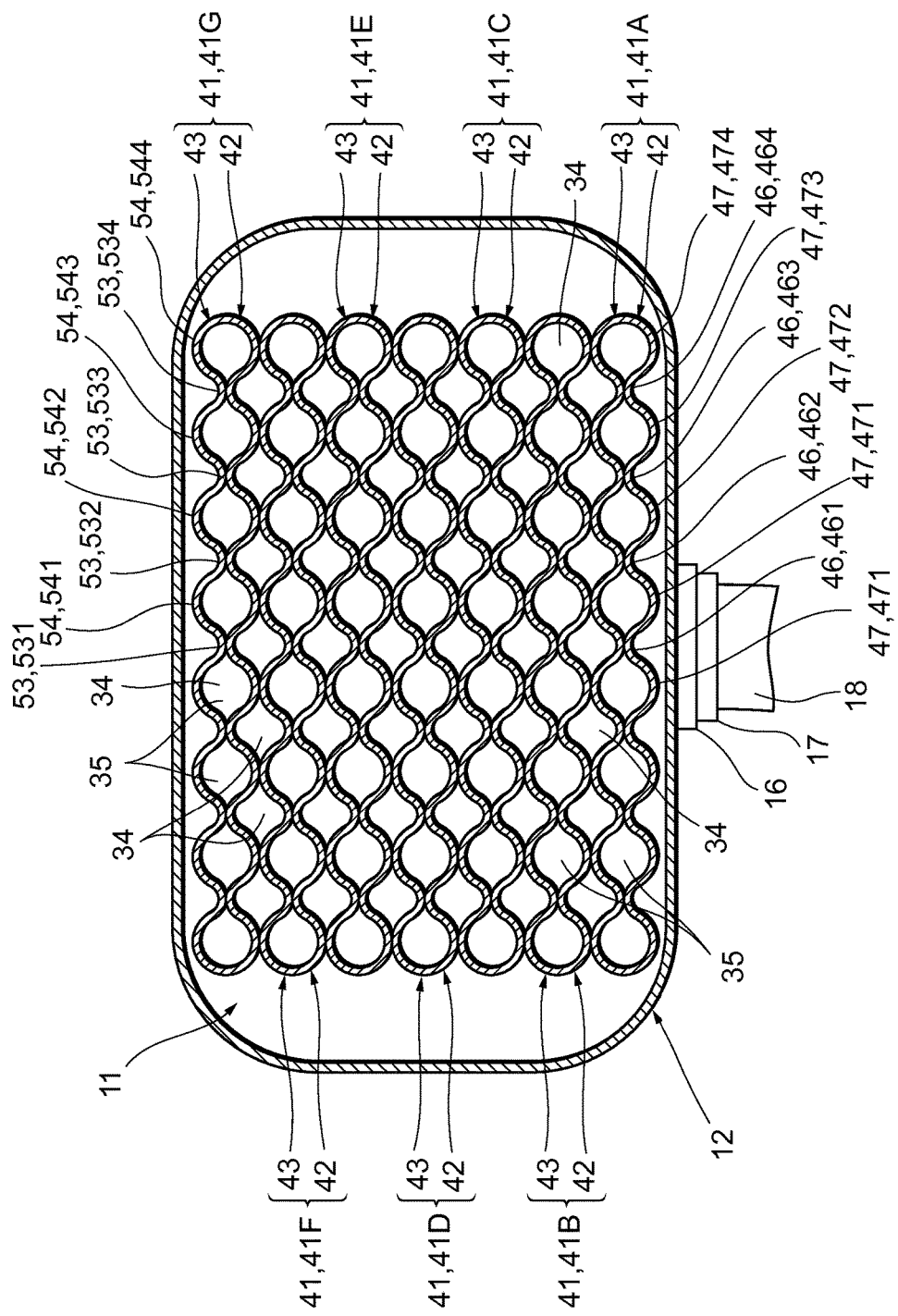
FIG. 11 is a cross-sectional view along the line XI-XI of FIG. 1.

In the top view, the shape of the lower plate member 42 is left-right symmetric about the central axis CE of the case 12, and is composed of a bottom part 44 and a lower peripheral wall 45 as shown in FIG. 9. The bottom part 44 has a hexagonal plate shape which is the same shape as the heat exchanger main body 31 in the top view. As also shown in FIG. 10 and FIG. 11, in the bottom part 44, a plurality of first ridges 46 bulging upward and a plurality of second ridges 47 bulging downward are formed. The first ridges 46 and the second ridges 47 extend parallel to the axial direction of the central axis CE of the case 12. The first ridges 46 and the second ridges 47 are disposed alternately in the parallel direction, i.e., the left-right direction, forming a wave pattern when viewed from the front side (see FIG. 10 and FIG. 11). The above expression "parallel to the axial direction of the central axis CE of the case 12" does not mean strict parallelism but encompasses substantial parallelism within the scope of the present invention.

The first ridges 46 are formed to be longer as they are disposed closer to the center in the left-right direction, that is, each first ridge 46 is equal to or longer than a next first ridge 46 in the outward direction. Specifically, as shown in FIG. 1, when the length of a first ridge 461 located closest to the center of the heat exchanger main body 31 is L11, the length of a first ridge 462 located on the outside of the first ridge 461 is L12 (the length L12 is not shown), the length of a first ridge 463 located on the outside of the first ridge 462 is L13 (the length L13 is not shown), and the length of a first ridge 464 located on the outside of the first ridge 463 is L14, these lengths satisfy the relation L11≥L12≥L13≥L14. In this embodiment, the relation is L11>L12>L13>L14.

Similarly, the second ridges 47 are formed to be longer as they are disposed closer to the center in the left-right direction, that is, each second ridge 47 is equal to or longer than a next second ridge 47 in the outward direction. Specifically, as shown in FIG. 1, when the length of a second ridge 471 located closest to the center of the heat exchanger main body 31 is L21, the length of a second ridge 472 located on the outside of the second ridge 471 is L22 (the length L22 is not shown), the length of a second ridge 473 located on the outside of the second ridge 472 is L23 (the length L23 is not shown), and the length of a second ridge 474 located on the outside of the second ridge 473 is L24, these lengths satisfy the relation L21≥L22≥L23≥L24. In this embodiment, the relation is L21>L22>L23>L24.

That is, in this embodiment, since the upstream side of the heat exchanger main body 31 protrudes farther in the upstream direction toward the center, the first ridges 46 and the second ridges 47 are formed to be longer as they are disposed closer to the center. In this embodiment, since the downstream side of the heat exchanger main body 31 protrudes farther in the downstream direction toward the center, the first ridges 46 and the second ridges 47 are formed to be even longer as they are located closer to the center.

The length of the first ridge 46 and the length of the second ridge 47 refer to the length from the end on the upstream side to the end on the downstream side in the direction extending parallel to the axial direction of the central axis CE of the case 12.

In this embodiment, both ends of the first ridges 46 and both ends of the second ridges 47 are tapered, and have a semicircular shape, for example, as shown in the top view (see FIG. 1).

A lower coupling port 48 is provided at the center of either the upstream side or the downstream side of the bottom part 44. The lower coupling port 48 is an opening part to be coupled with an upper coupling port 55 to be described later. The lower coupling port 48 of the lower plate member 42 located in the lowermost part of the heat exchanger main body 31 functions as the supply port 32.

The lower peripheral wall 45 is a wall provided at the outer peripheral edge of the bottom part 44 and extending upward.

The upper plate member 43 is the same member as the lower plate member 42, and is equivalent to the lower plate member 42 turned upside down. Specifically, as shown in FIG. 9, the upper plate member 43 is composed of a ceiling part 51 which corresponds to the bottom part 44 of the lower plate member 42, and an upper peripheral wall 52 which corresponds to the lower peripheral wall 45 of the lower plate member 42. The ceiling part 51 has a hexagonal plate shape which is the same shape as the heat exchanger main body 31 in the top view. As also shown in FIG. 10 and FIG. 11, in the ceiling part 51, a plurality of third ridges 53 bulging downward and a plurality of fourth ridges 54 bulging upward are formed.

The third ridges 53 correspond to the first ridges 46 of the lower plate member 42, and the fourth ridges 54 correspond to the second ridges 47 of the lower plate member 42. That is, the third ridges 53 and the fourth ridges 54 extend parallel to the axial direction of the central axis of the case 12, and the third ridges 53 and the fourth ridges 54 are disposed alternately in the parallel direction, i.e., the left-right direction, forming a wave pattern when viewed from the front side (see FIG. 10 and FIG. 11).

The third ridges 53 are formed to be longer as they are disposed closer to the center in the left-right direction, that is, each third ridge 53 is equal to or longer than a next third ridge 53 in the outward direction. Specifically, in the top view of the heat exchanger main body 31, the first ridge 46 and the third ridge 53 have the same shape and the length of the first ridge 46 and the length of the third ridge 53 are equal. Specifically, as shown in FIG. 11, the third ridges 53 of this embodiment are disposed in the order of a third ridge 531, a third ridge 532, a third ridge 533, and a third ridge 534, from the center toward the outside of the heat exchanger main body 31.

Similarly, the fourth ridges 54 are formed to be longer as they are disposed closer to the center in the left-right direction, that is, each fourth ridge 54 is equal to or longer than a next fourth ridge 54 in the outward direction. Specifically, in the top view of the heat exchanger main body 31, the second ridge 47 and the fourth ridge 54 have the same shape and the length of the second ridge 47 and the length of the fourth ridge 54 are equal. Specifically, as shown in FIG. 11, the fourth ridges 54 of this embodiment are disposed in the order of a fourth ridge 541, a fourth ridge 542, a fourth ridge 543, and a fourth ridge 544, from the center toward the outside of the heat exchanger main body 31.

In this embodiment, as with the first ridges 46 and the second ridges 47, both ends of the third ridges 53 and both ends of the fourth ridges 54 are tapered, and, for example, have a semicircular shape in the top view (see FIG. 9).

The above-mentioned upper coupling port 55 is provided at the center of either the upstream side or the downstream side of the ceiling part 51. The upper coupling port 55 is an opening part to be coupled with the lower coupling port 48. The upper coupling port 55 of the upper plate member 43 located in the uppermost part of the heat exchanger main body 31 functions as the discharge port 33.

The upper peripheral wall 52 corresponds to the lower peripheral wall 45 of the lower plate member 42, and is a wall provided at the outer peripheral edge of the ceiling part 51 and extending downward.

In a pair of lower plate member 42 and upper plate member 43 composing the heat exchanger piece 41, the lower peripheral wall 45 and the upper peripheral wall 52 are connected with each other by welding etc.

More specifically, as also shown in FIG. 3, FIG. 4, FIG. 10, and FIG. 11, the heat exchanger main body 31 in this embodiment is composed of a stack of heat exchanger pieces 41A to 41G. The heat exchanger piece 41A is provided in the lowermost part of the heat exchanger pieces 41 composing the heat exchanger main body 31; the heat exchanger piece 41B is provided on the heat exchanger piece 41A; the heat exchanger piece 41C is provided on the heat exchanger piece 41B; the heat exchanger piece 41D is provided on the heat exchanger piece 41C; the heat exchanger piece 41E is provided on the heat exchanger piece 41D; the heat exchanger piece 41F is provided on the heat exchanger piece 41D; and the heat exchanger piece 41G is provided on the heat exchanger piece 41E, i.e., in the uppermost part.

The heat exchanger pieces 41A to 41G are stacked such that the lower coupling ports 48 are located alternately on the downstream side and the upstream side in the stacking direction. For example, the lower coupling port 48 of the lower plate member 42 of the heat exchanger piece 41A is located in the lower surface at the center on the downstream side, and the upper coupling port 52 of the upper plate member 43 is located in the upper surface at the center on the upstream side. Then, the lower coupling port 48 of the lower plate member 42 of the heat exchanger piece 41B is located in the lower surface at the center on the upstream side, and the upper coupling port 52 of the upper plate member 43 is located in the upper surface at the center on the downstream side.

Subsequently, the heat exchanger pieces 41C, 41E, 41G are disposed in the same direction as the heat exchanger piece 41A as shown in FIG. 4. That is, the lower coupling ports 48 of the lower plate members 42 of the heat exchanger pieces 41C, 41E, 41G are located in the respective lower surfaces at the center on the downstream side, and the upper coupling ports 55 of the upper plate members 43 are located in the respective upper surfaces at the center on the upstream side. As described above, the lower coupling port 48 of the heat exchanger 41A, which is located in the lowermost part of the heat exchanger main body 31, serves as the supply port 32, and the upper coupling port 55 of the heat exchanger piece 41G serves as the discharge port 33.

The heat exchanger pieces 41D, 41F are disposed in the same direction as the heat exchanger piece 41B. That is, the lower coupling ports 48 of the lower plate members 42 of the heat exchanger pieces 41D, 41F are located in the respective lower surfaces at the center on the upstream side, and the upper coupling ports 55 of the upper plate members 43 are located in the respective upper surfaces at the center on the downstream side.

According to this configuration, the supply port 32 and the discharge port 33 of the heat exchanger 11 are disposed so as to coincide with the central axis CE of the case 12 in the top view.

The lower coupling port 48 of the lower plate member 42 and the upper coupling port 55 of the upper plate member 43 adjacent to each other in the stacking direction are connected with each other through brazing etc.

(First Passage and Second Passage)

Next, the first passage 34 and the second passage 35 will be described.

Specifically, as shown in FIG. 10 and FIG. 11, in the heat exchanger main body 31, the first ridges 46 and the third ridges 53 are disposed in contact with each other in a pair of lower plate member 42 and upper plate member 43 composing the heat exchanger piece 41. The second ridges 47 and the fourth ridges 54 are disposed in contact with each other in the lower plate member 42 and the upper plate member 43 adjacent to each other in the stacking direction.

As shown in FIG. 10 and FIG. 11, in the heat exchanger main body 31, a clearance is formed between two heat exchanger pieces 41 adjacent to each other in the stacking direction. This clearance is the first passage 34. Specifically, the first passage 34 is a clearance formed by the first ridge 46 and the third ridge 53 in the lower plate member 42 and the upper plate member 43 adjacent to each other in the stacking direction.

The space inside the heat exchanger piece 41 is the second passage 35. Specifically, the second passage 35 is the clearance between the second ridge 47 and the fourth ridge 54 in the lower plate member 42 and the upper plate member 43 composing the heat exchanger piece 41.

Here, as described above, the first ridges 46, the second ridges 47, the third ridges 53, and the fourth ridges 54 extend parallel to the axial direction of the central axis CE of the case 12, and are formed to be longer as they are disposed closer to the center in the left-right direction. Therefore, as described above, the first passages 34 and the second passages 35 extend parallel to the central axis CE of the case 12, and are formed to be longer as they are disposed closer to the center of the heat exchanger main body 31. That is, since those first ridges 46 and third ridges 53 located in the vicinity of the center of the heat exchanger main body 31 are formed to be longer than those first ridges 46 and third ridges 53 located on the outside, the first passages 34 are also longer as they are located closer to the center of the heat exchanger main body 31.

Since those second ridges 47 and fourth ridges 54 located in the vicinity of the center of the heat exchanger main body 31 are also formed to be longer than those second ridges 47 and fourth ridges 54 located on the outside, the second passages 35 are also longer as they are located closer to the center of the heat exchanger main body 31.

Since the ends of the first ridges 46, the second ridges 47, the third ridges 53, and the fourth ridges 54 are all tapered, for example, as shown in FIG. 6, the passage width in the vicinity of the end of the second passage, which is formed by the fourth ridge 54 (the second ridge not shown in FIG. 6) located between the third ridges 53 (the first ridges not shown in FIG. 6), increases toward the upstream side and increases toward the downstream side as well. The passage width of the first passage 34, which is formed by the third ridge 53 (first ridge 46) located between the fourth ridges 54 (second ridges 47), also increases toward the upstream side and increases toward the downstream side as well.

The width direction of the passage width coincides with the left-right direction of the case 12.

Next, the operation and effect of the heat exchanger 11 will be described.

(Exhaust Gas Flow)

In a side view from one direction, in this embodiment, in the top view, the heat exchanger main body 31 has a shape which is left-right symmetric about the central axis CE of the case 12 and of which the upstream side protrudes farther in the upstream direction toward the center. Accordingly, the exhaust gas flowing from the inlet part 13 side of the case 12 to the heat exchanger 11 hits the upstream side of the heat exchanger main body 31, and thereby spreads easily from the center of the heat exchanger main body 31 to the outside and flows efficiently to the vicinity of the outside of the heat exchanger main body 31.

Since the first passages 34 extend parallel to the central axis CE of the case 12, the exhaust gas flows (linearly) parallel to the central axis CE of the case 12 with as little resistance as possible. Moreover, since the plurality of first passages 34 are formed to be longer as they are disposed closer to the center of the heat exchanger main body 31, the exhaust gas flows easily to the vicinity of the outside where the passages are shorter than in the vicinity of the center of the heat exchanger main body 31.

Since the passage width of the first passages 34 on the upstream side increases toward the upstream side, the cooling water flows easily into the first passages 34.

The exhaust gas having flowed through the first passage 34 of the heat exchanger 11 and the exhaust gas having flowed between the heat exchanger 11 and the housing part 15 flow out through the outlet part 14 of the case 12 to a subsequent process in the exhaust passage.

(Cooling Water Flow)

The cooling water flowing through the first tube 18 is housed to the inside of the heat exchanger main body 31 from the supply port 32 of the heat exchanger 11, and flows through the plurality of second passages 35 arrayed in the left-right direction. In this embodiment, as shown in FIG. 4, the cooling water flows toward the upstream side while turning back in the front-rear direction inside the heat exchanger main body 31. Heat is exchanged between the exhaust gas and the cooling water as the exhaust gas flowing inside the case 12 comes into contact with the heat exchanger 11 while flowing through the first passages 34 etc. of the heat exchanger 11. The cooling water discharged from the discharge port 33 of the heat exchanger 11 flows into the second tube 21.

More specifically, the cooling water flowing inside the heat exchanger main body 31 is housed to the inside of the heat exchanger piece 41A from the supply port 32 (lower coupling port 48 of the heat exchanger piece 41A) of the heat exchanger 11, and flows through the second passages 35 arrayed in the left-right direction.

Here, since the plurality of second passages 35 of the heat exchanger piece 41A extend parallel to the central axis CE of the case 12, the cooling water flows (linearly) parallel to the central axis CE of the case 12 with as little resistance as possible. Moreover, since the plurality of second passages 35 are formed to be longer as they are disposed closer to the center of the heat exchanger main body 31, the cooling water flows easily to the vicinity of the outside where the passages are shorter than in the vicinity of the center of the heat exchanger main body 31.

The cooling water having flowed through the second passages 35 of the heat exchanger piece 41A flows through the upper coupling port 55 of the heat exchanger piece 41A and the lower coupling port 48 of the heat exchanger piece 41B, and flows through the plurality of second passages 35 of the heat exchanger piece 41B. When the cooling water flows through the plurality of second passages 35 of the heat exchanger piece 41B, as with when the cooling water flows through the plurality of second passages 35 of the heat exchanger piece 41A, the cooling water flows parallel to the central axis CE of the case 12 with as little resistance as possible, and the cooling water flows easily to the vicinity of the outside where the passages are shorter than in the vicinity of the center of the heat exchanger main body 31.

Then, the cooling water having flowed through the second passages 35 of the heat exchanger piece 41B flows through the upper coupling port 55 of the heat exchanger piece 41B and the lower coupling port 48 of the heat exchanger piece 41C, and flows through the plurality of second passages 35 of the heat exchanger piece 41C. Subsequently, the cooling water flows through the second passages 35 on the inside of each of the heat exchanger piece 41D, the heat exchanger piece 41E, the heat exchanger piece 41F, and the heat exchanger piece 41G.

Here, when the cooling water flows through the second passages 35 of each of the heat exchanger piece 41C, the heat exchanger piece 41D, the heat exchanger piece 41E, the heat exchanger piece 41F, and the heat exchanger piece 41G, as with when the cooling water flows through the second passages 35 of the heat exchanger pieces 41A, 41B, the cooling water flows parallel to the central axis CE of the case 12 with as little resistance as possible since the second passages 35 extend parallel to the central axis CE of the case 12. Moreover, since the second passages 35 of each of the heat exchanger piece 41C, the heat exchanger piece 41D, the heat exchanger piece 41E, the heat exchanger piece 41F, and the heat exchanger piece 41G are formed to be longer as they are disposed closer to the center of the heat exchanger main body 31, the cooling water flows easily to the vicinity of the outside where the passages are shorter than in the vicinity of the center of the heat exchanger main body 31.

Since the passage width of the second passages 35 on the upstream side increases toward the upstream side, the cooling water flows easily into the second passages 35.

The cooling water discharged from the upper coupling port 55 (discharge port 33) of the heat exchanger piece 41G of the heat exchanger main body 31 flows into the second tube 21.

According to this embodiment, the exhaust gas flows throughout the heat exchanger main body 31 as evenly as possible, which allows efficient heat exchange between the exhaust gas and the cooling water. Moreover, the exhaust gas after exchanging heat can be made less likely to stagnate inside the heat exchanger main body 31 (first passages 34), and can be easily sent out to the downstream side of the heat exchanger 11.

Furthermore, the cooling water flows throughout the inside of the heat exchanger main body 31 as evenly as possible, which allows more efficient heat exchange between the exhaust gas and the cooling water. The cooling water after exchanging heat can be made less likely to stagnate inside the heat exchanger main body 31 (second passages 35), and can be easily sent out to the downstream side of the heat exchanger 11.

Since the passage width of the first passages 34 on the upstream side increases toward the upstream side, the cooling water flows easily into the first passages 34. Therefore, the exhaust gas can be supplied efficiently into the heat exchanger main body 31, which allows more efficient heat exchange.

Since the passage width of the second passages 35 on the upstream side increases toward the upstream side, the cooling water flows easily into the second passages 35. Therefore, as the cooling water flows easily into the second passages 35, the cooling water can be supplied efficiently to the second passages 35 of the heat exchanger 11, which allows more efficient heat exchange.

Second Embodiment

The configuration of a heat exchanger of a second embodiment will be described with reference to FIG. 12. Description of the same structures as in the first embodiment will be omitted.

The structure of a heat exchanger 61 of the second embodiment has almost the same shape as the structure of the heat exchanger 11 of the first embodiment. However, in the heat exchanger 61, the inside of heat exchanger pieces 63, which are adjacent to each other in the stacking direction, communicate with each other through a downstream-side coupling port 64 in the lower surface of a heat exchanger main body 62 at the center on the downstream side, and the inside of the heat exchanger pieces 63, which are adjacent to each other in the stacking direction, also communicate with each other through an upstream-side coupling port 65 at the center on the upstream side of the heat exchanger main body 62.

Figure 12:
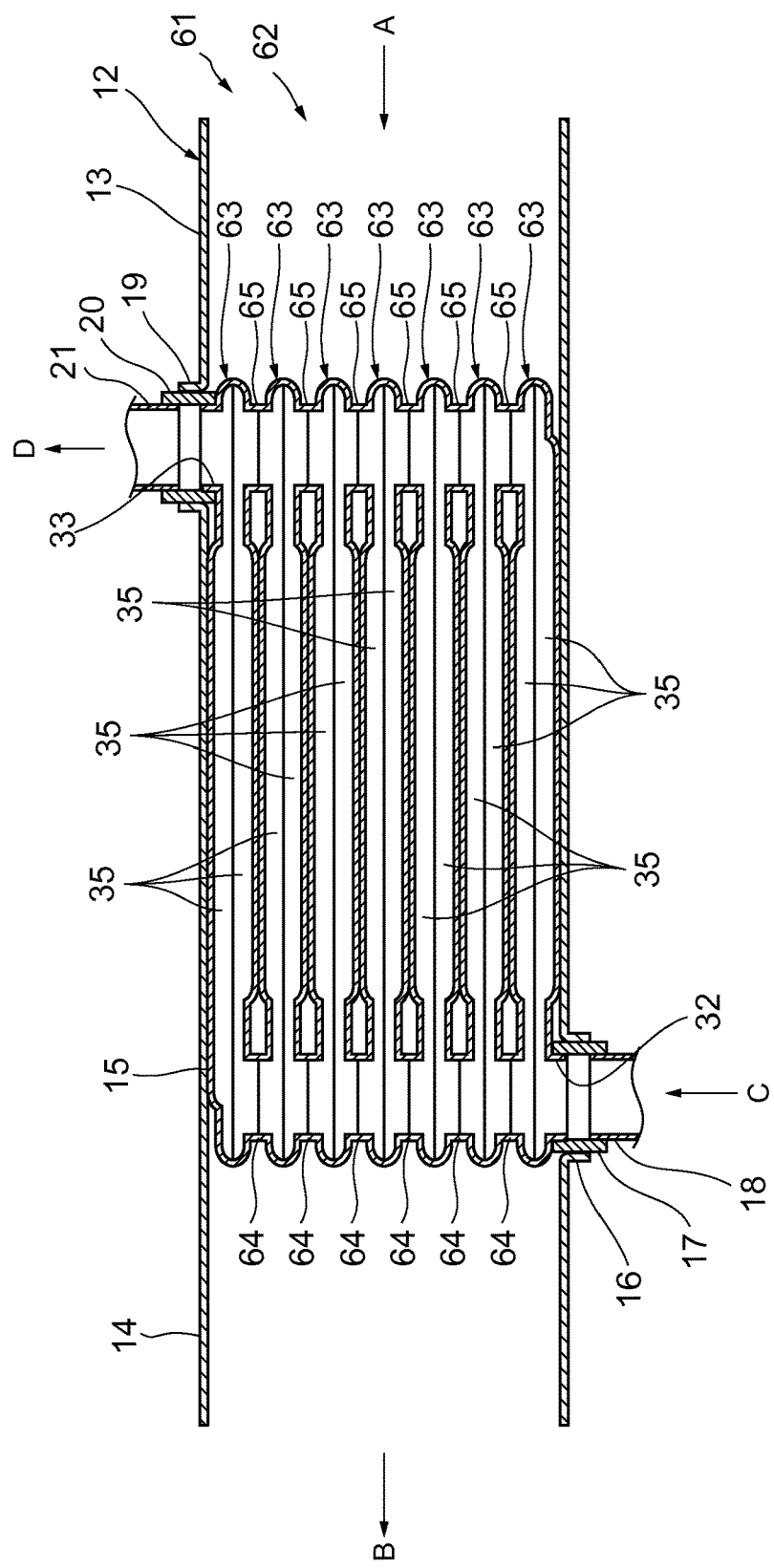
FIG. 12 is a view, equivalent to FIG. 4, showing a heat exchanger of a second embodiment of the present invention.

That is, in the second embodiment, as shown in FIG. 12, the downstream-side coupling ports 64 and the upstream-side coupling ports 65 are provided in the heat exchanger pieces 63 in the structure of the heat exchanger 11 (see FIG. 4) of the first embodiment. In other words, the heat exchanger pieces 63 have almost the same shape as the heat exchanger pieces 41 of the first embodiment and have the first passages (not shown) and the second passages 35, but the heat exchanger pieces 63 differ from the heat exchanger pieces 41 in that the former are provided with the downstream-side coupling ports 64 and the upstream-side coupling ports 65.

According to this configuration, the cooling water supplied from the supply port 32 of the heat exchanger 61 flows through the downstream-side coupling ports 64 and flows through the inside of each of the heat exchanger pieces 63 in parallel, and further flows through the upstream-side coupling ports 65 and is discharged from the discharge port 33 of the heat exchanger 61. When the cooling water flows inside the heat exchanger pieces 63, as in the first embodiment, the cooling water flows through the second passages 35 formed in the heat exchanger pieces 63.

While the heat exchanger 61 of this embodiment differs from the first embodiment in flow direction of the cooling water, the operation and effect of heat exchange similar to that of the first embodiment can be obtained.

Third Embodiment

The configuration of a heat exchanger of a third embodiment will be described with reference to FIG. 13. Description of the same structures as in the second embodiment will be omitted.

The structure of a heat exchanger 71 of the third embodiment is similar to the structure of the heat exchanger 61 of the second embodiment, but differs from the structure of the heat exchanger 61 of the second embodiment in that a discharge port 72 is provided in the lower surface of the heat exchanger 71 at the center on the same side as the supply port 32, i.e., on the upstream side.

According to this configuration, as in the second embodiment, the cooling water supplied from the supply port 32 of the heat exchanger 71 flows through the downstream-side coupling port 64, flows through the inside of each of the heat exchanger pieces 63 in parallel, and flows through the upstream-side coupling port 76 before being discharged from the discharge port 72. When the cooling water flows through the inside of the heat exchanger pieces 63, the cooling water flows through the second passages 35 as in the first embodiment. Therefore, with the heat exchanger 71 of this embodiment, the operation and effect of heat exchange similar to that of the first embodiment can be obtained.

Other Embodiments

The heat exchangers of the embodiments of the present invention are not limited to the above examples, but can take various forms within the technical scope of the present invention.

While the heat exchangers of the embodiments of the present invention have been described by means of the example where the present invention is applied to a heat exchanger which exchanges heat between exhaust gas and cooling water, the present invention can also be applied to other heat exchangers, for example, heat exchangers which exchange heat between two liquids or two gases. In the embodiments, the first fluid may be cooling water and the second fluid may be exhaust gas. The shape of the case may be appropriately changed according to the shape of the heat exchanger.

In the description of the embodiments of the present invention, the heat exchanger is left-right symmetric relative to the central axis of the case, in the top view from above as an example of the side view. However, the heat exchanger may be left-right symmetric relative to the central axis of the case, for example, in the side view from the lateral side shown in FIG. 3.

In the description of the embodiments of the present invention, the heat exchanger (heat exchanger main body) has a hexagonal shape in the top view. However, the heat exchanger may have a circular shape, an elliptical shape, or a polygonal shape other than a hexagonal shape in the top view. In this case, the heat exchanger is disposed in left-right symmetry with the end of the heat exchanger main body protruding farthest in the upstream direction.

In the description of the embodiments of the present invention, the supply port is provided at the center on the downstream side of the heat exchanger main body. However, the supply port may be provided at the center on the upstream side of the heat exchanger main body. Alternatively, the supply port may be provided in the upper surface of the heat exchanger main body.

The discharge port provided in the heat exchanger main body may be provided in one of the upper surface and the lower surface at the center on the downstream side of the heat exchanger main body and the upper surface and the lower surface at the center on the upstream side of the heat exchanger main body, whichever is not provided with the supply port.

Both ends of the first to fourth ridges may be tapered.

In addition, the above-described configurations are mere examples, and the structure, number, material, joining method, etc. may be appropriately changed.

In the description of the present invention, the plurality of first passages are formed to be longer as they are disposed closer to the center of the heat exchanger main body. However, the present invention encompasses the case where two first passages adjacent to each other in the width direction of the first passage are equal in length. Similarly, in the description of the present invention, the plurality of second passages are formed to be longer as they are disposed closer to the center of the heat exchanger main body. However, the present invention encompasses the case where two second passages adjacent to each other in the width direction of the second passage are equal in length.

REFERENCE SIGNS LIST

11 Heat exchanger
12 Case
13 Inlet part
14 Outlet part
15 Housing part
16 Downstream-side opening part
17 Seal member
18 Tube
19 Upstream-side opening part
20 Seal member
21 Tube
31 Heat exchanger main body
32 Supply port
33 Discharge port
34 First passage
35 Second passage
41 Heat exchanger piece
42 Lower plate member
43 Upper plate member
44 Bottom part
45 Lower peripheral wall
46 Ridge
47 Ridge
48 Lower coupling port
51 Ceiling part
52 Upper peripheral wall
53 Ridge
54 Ridge
55 Upper coupling port
61 Heat exchanger
62 Heat exchanger main body
63 Heat exchanger piece
64 Downstream-side coupling port
65 Upstream-side coupling port
71 Heat exchanger
72 Discharge port
76 Upstream-side coupling port

The invention claimed is:

1. A heat exchanger which exchanges heat between a first fluid and a second fluid, the heat exchanger comprising a case and a heat exchanger main body that is housed inside the case such that the first fluid flows through the heat exchanger main body, and the second fluid is housed in the heat exchanger main body, wherein:
   the heat exchanger main body includes a stack of a plurality of heat exchanger pieces,
   each of the heat exchanger pieces includes a pair of a lower plate member and an upper plate member, the lower plate member forms a lower part of the heat exchanger piece, wherein a plurality of first ridges bulging upward and a plurality of second ridges bulging downward are formed in a bottom part of the lower plate member, the upper plate member forms an upper part of the heat exchanger piece, wherein a plurality of third ridges bulging downward and a plurality of fourth ridges bulging upward are formed in a ceiling part of the upper plate member, the first ridges, the second ridges, the third ridges, and the fourth ridges extend parallel to an axial direction of a central axis of the case, the first ridges and the third ridges, in the lower plate member and the upper plate member adjacent to each other in the stacking direction, form a plurality of first passages which are disposed such that the first fluid flows across the inside of the heat exchanger main body from an upstream side to a downstream side of the heat exchanger main body, the second ridges and the fourth ridges, in the lower plate member and the upper plate member adjacent to each other in the stacking direction, form a plurality of second passages which are disposed such that the second fluid flows, in a side view from one direction, the heat exchanger main body forms a shape which is left-right symmetric about the central axis of the case, and a center of the upstream side of the heat exchanger main body protrudes farther upstream in the axial direction toward the center, the plurality of first passages extend substantially parallel to the central axis of the case, and are formed to be longer as they are disposed closer to the center of the heat exchanger main body, and the passage width of the first passages on the upstream side increases toward the upstream side, and ends of the first ridges, the second ridges, the third ridges, and the fourth ridges on the upstream side are all tapered such that the passage width both of the first passages and the second passages on the upstream side increase toward the upstream side;

a supply port configured to supply the second fluid to the inside of the heat exchanger main body is formed in the heat exchanger main body at one of the center on the upstream side and the center on the downstream side, a discharge port configured to discharge the second fluid from the inside of the heat exchanger main body is formed in the heat exchanger main body at the other one of the center on the upstream side and the center on the downstream side, and a meander channel is defined inside the heat exchanger main body such that the meander channel is configured to repeatedly supply the second fluid to a portion in which the width of the second passages on the upstream side increase toward the upstream side.

2. The heat exchanger according to claim 1, wherein:

the second passages are disposed such that the second fluid supplied from the supply port flows toward the discharge port, and the plurality of second passages extend substantially parallel to the central axis of the case, and are formed to be longer as they are disposed closer to the center of the heat exchanger main body.

\* \* \* \* \*